(12) United States Patent
Setchell et al.

(10) Patent No.: US 11,643,323 B2
(45) Date of Patent: May 9, 2023

(54) PUMP MONITORING SYSTEM

(71) Applicant: Spot You More, Inc., Raleigh, NC (US)

(72) Inventors: Joel R. Setchell, Advance, NC (US); Daniel S. Michels, Tobaccoville, NC (US)

(73) Assignee: SPOT YOU MORE, INC., Raleigh, NC (US)

( * ) Notice: Subject to any disclaimer, the term of this patent is extended or adjusted under 35 U.S.C. 154(b) by 736 days.

(21) Appl. No.: 16/671,591

(22) Filed: Nov. 1, 2019

(65) Prior Publication Data

US 2020/0140256 A1 May 7, 2020

Related U.S. Application Data

(60) Provisional application No. 62/755,037, filed on Nov. 2, 2018.

(51) Int. Cl.
| | | |
|---|---|---|
| *G01P 13/00* | (2006.01) | |
| *B67D 7/32* | (2010.01) | |
| *G06Q 10/0631* | (2023.01) | |
| *G01F 23/80* | (2022.01) | |

(52) U.S. Cl.
CPC ......... *B67D 7/3209* (2013.01); *G01F 23/802* (2022.01); *G01P 13/00* (2013.01); *G06Q 10/06311* (2013.01)

(58) Field of Classification Search
CPC ........ G01S 5/02; G01S 5/0295; G07F 13/025; B67D 7/3209; H04L 67/306; H04L 67/12; H04W 4/023; H04W 4/14; G06Q 10/06311; G06Q 30/0208; B09C 1/10; B09C 2101/00; G01P 13/00; G01F 23/802; G01F 23/00
See application file for complete search history.

(56) References Cited

U.S. PATENT DOCUMENTS

| | | | | |
|---|---|---|---|---|
| 10,192,381 B2* | 1/2019 | Fieglein | ............. | G07C 9/00563 |
| 10,360,647 B2* | 7/2019 | Pallas | ....................... | B67D 7/34 |
| 10,467,581 B2* | 11/2019 | Laury | ................. | G01C 21/343 |
| 10,679,444 B2* | 6/2020 | Fieglein | ............. | G07C 9/00182 |
| 11,066,976 B2* | 7/2021 | Kurtz | ...................... | F02D 29/02 |
| 11,151,821 B2* | 10/2021 | Fieglein | ................... | G08B 3/10 |
| 11,170,434 B1* | 11/2021 | Perry | ................. | G06Q 30/0641 |
| 11,186,477 B2* | 11/2021 | Dudar | ................... | B60K 15/03 |
| 11,361,299 B2* | 6/2022 | Morris | ................... | G06Q 20/32 |
| 11,377,342 B2* | 7/2022 | Fieglein | ............... | B67D 7/3209 |

(Continued)

OTHER PUBLICATIONS

Riekert et al., Fuel allocation and lockout system, 2018, IEEE, p. 218-223 (Year: 2018).*

(Continued)

*Primary Examiner* — McDieunel Marc
(74) *Attorney, Agent, or Firm* — Burr & Forman LLP

(57) ABSTRACT

A fuel pump monitoring module for monitoring attributes related to a fuel pump at a gas station. The fuel pump monitoring module may have a body for attachment to the fuel pump. A transmitter or receiver is connected to the body and configured to communicate with a bioremediation dispensing unit using a transmission signal. A processor is connected to the body and configured to determine the location of the bioremediation dispensing unit relative to the fuel pump monitoring module based on the transmission signal.

22 Claims, 9 Drawing Sheets

(56) References Cited

U.S. PATENT DOCUMENTS

2017/0308965 A1 10/2017 Morris et al.
2018/0028038 A1 2/2018 Setchell et al.

OTHER PUBLICATIONS

Gupta et al., IoT based smart petrol pump, 2016, IEEE, p. 28-32 (Year: 2016).*
Srinivasan et al., A System Design for the Regulated Distribution of Automotive Fuel Using RFID, 2015, IEEE, p. 391-395 (Year: 2015).*
Yang et al., Research of Petroleum Well Fuel Pump Measurement & Control System Based on Internet of Things Technology, 2017, IEEE, pg. (Year: 2017).*
International Search Report for corresponding PCT International Application No. PCT/US2019/059376, dated Mar. 2, 2020.
Satya Ganti et al., "Spill Cleanup of Fuel Contaminated Soils After Roadway Accidents Using In Situ Bioremediation," Proceedings of the Annual International Conference on Soils, sediments, Water and Energy, vol. 13, Jan. 1, 2010, 9 pgs.

\* cited by examiner

510

| ID | Name | Time In | Time Out | Tasks | Pay | Rating | Emp Type |
|---|---|---|---|---|---|---|---|
| 001 | Joe | 1/27/17 9:00 | 1/27/17 14:00 | Check Pump Door | 18.00 | 9.5 | Manager 1 |
| 002 | Jane | 1/27/17 8:30 | 1/27/17 15:30 | Inspect Pump Area for Deposits | 15.25 | 8.7 | Clerk 1 |

512

| Task ID | Task | Location | Time Start | Time Comp | Priority | Emp | Prod | Alarm Rules | Emp Cost | Waste Cost | Offer Rules |
|---|---|---|---|---|---|---|---|---|---|---|---|
| 445 | Check Pump Door | Store 631 | 1/27/17 9:30 | 1/27/17 9:45 | High | 001 | Gas | Alert Mngr >3 min | 2.35 | $0 | None |
| 446 | Offer Coffee | Store 631 | 1/27/17 10:00 | 1/27/17 10:05 | Med | 002 | Coffee | Alert Mngr >15 min | 4.50 | $2.40 | Coffee 10% off |
| 447 | Inspect Pump Area for Deposit | Store 631 | 1/27/17 10:25 | 1/27/17 10:27 | Med | 002 | Gas | Alert Mngr >15 min | 3.20 | $0 | Offer 0.05 cents a gallon for survey |

514

| Report ID | Location | Time Start | Time Comp | Task | Emp | Prod | Offer Rules | Details |
|---|---|---|---|---|---|---|---|---|
| 225 | Store 631 | 1/27/17 9:30 | 1/27/17 9:45 | Inspect Pump Area for Deposits | 001 | Gas | $0.05 off next fill up | Gas Deposit at Pump |
| 226 | Store 631 | 1/27/17 10:00 | 1/27/17 10:05 | Make Coffee | 002 | Coffee | Two free coffees | Coffee was not fresh |

516

| Prod ID | Prod | Location | Task | Waste Cost | Offer Rules | Offer Sold | Total Sold |
|---|---|---|---|---|---|---|---|
| 105 | Gas | Store 631 | 445 | $0 | $0.05 off next fill up | $157 | $982 |
| 106 | Coffee | Store 631 | 446 | $2.40 | Coffee Free 10 min before change | $77 | $388 |

Figure 4

PUMP MONITORING SYSTEM

RELATED APPLICATIONS

This application claims the benefit of U.S. Provisional Patent Application No. 62/755,037, filed Nov. 2, 2018, entitled "PUMP MONITORING SYSTEM", the content of which is hereby incorporated by reference in its entirety.

BACKGROUND

1. Field of the Invention

The present invention generally relates to pump monitoring.

2. Description of Related Art

Convenience stores, especially stores attached to gas stations, are trying to increase revenue and store traffic. Often convenience stores, especially those attached to a gas station, are eager to convert customers purchasing gas to consider purchasing other items from the convenience store. In addition pump monitoring can also help with security issues related to fuel pumps.

SUMMARY

The present disclosure describes a system for pump monitoring, for example at a gas station with a convenience store.

Various sensors may be used to monitor various processes, products, systems, devices and equipment within a gas station/convenience store. The sensors and system may identify certain conditions that require action by personnel, such as store clerks, managers, maintenance people, etc. The sensors and system may identify certain conditions that require action by the system, device, product and equipment manufacturer or vendor. The measured conditions may include an element such as the length of time since the area around each pump has been inspected for a deposit of gas or oil. The measured conditions may be based on the length of time that the customer at the pump has entered the store based on a user profile and may include the ability to deploy a coupon. As an example, the pump monitoring system may communicate with an application (e.g. a loyalty application) on the customers mobile device (e.g. cell phone) and determine the amount of time since the user has entered a convenience store connected with the gas station, this information may be included in a communication to the consumer with a coupon. The measured conditions may alert store personnel, a product manufacturer, or distribution center of inventory levels and customer preferences. The measured conditions may further enable automated replenishment orders to a manufacturer or distribution center. The sensors may also verify when tasks have been completed by the personnel. For example, if the system identifies that it has been more than 24 hours since the bioremediation has been brought in close proximity to the pump, the system may set a task or alert to the employee, receive a confirmation that the appropriate personnel was actually notified of the task, and the system may record the amount time that it takes for the personnel to complete the task (for example, inspecting the pumps with a device that signifies the employee has been at the pump, e.g. with a bioremediation container that communicates with the pump monitoring device).

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 4 is an illustration of a database for one implementation of a pump monitoring system.

DETAILED DESCRIPTION

Figure 1:
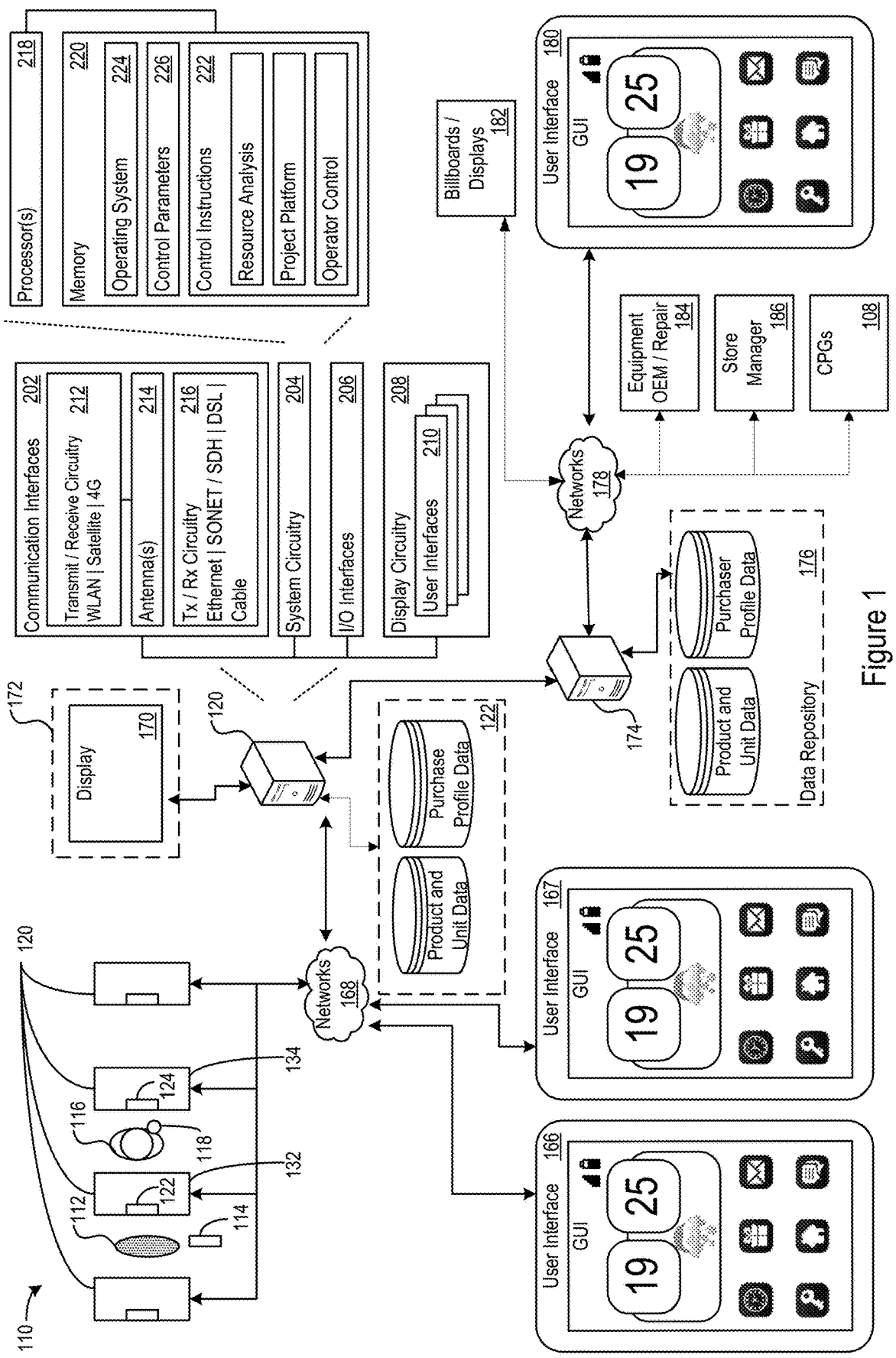
FIG. 1 is a block diagram of a system for pump monitoring.

Personnel in a gas station may have to monitor and complete a wide variety of tasks in a very busy environment. With expanding offerings in convenience stores, tracking and verifying tasks is becoming more important. Sensor and point of sale information can provide important indicators of when and how well tasks are being accomplished. Sensors may be used in conjunction with retail locations such as convenience stores and gas stations. The sensors may be in and around the fuel pumps as well as the convenience store. For example some sensors may be located at fixed locations within or around the fuel pumps or may be attached to or integrated within certain devices within the store. The devices may be moveable within the premises, such as employee tags, or bioremediation dispensing devices which employees may use to maintain tasks on the premises. The sensors at fixed locations on the premises may also interact with the devices to provide location of the devices within the store. Sensors attached to or integrated within the devices may provide information regarding the use of the device and/or location of the device. Further, information may be provided that relate the usage characteristics to one another or time intervals to interpret how the device is being used. The analysis may compare usage of the device to proper usage characteristics, for example the amount of bioremediation in the dispensing device or actuation of the dispensing mechanism (e.g. spray trigger). Analysis of the usage may be based on defined logic and thresholds defined within the device, a local server, or a cloud based analytics platform. The local server or analytics platform may house the data pushed up from the sensor devices and notification alerts may be triggered based on certain events. Certain data may be distributed by the server to relevant stakeholders based on a defined frequency or immediately based on certain conditions being met.

The system may generate, collect and monitor data related to tasks assigned to personnel. The data may include notification of a task, accepted task employee ID, accepted task time, presentation of task location (e.g. on a map), presentation of task description/check list, assistance notification, notification from personnel that the task has been completed, confirmation from sensor system that the task has been completed, feedback from store manager regarding quality of performed tasks, incentives provided to consumers to provide quality feedback related to tasks, ratings for particular personnel (e.g. based on time to start tasks, time to complete tasks), quality feedback of tasks (consumers/store manager, product manufacturers, OEM equipment manufacturers), notification to inform store manager if time to complete task has exceeded a threshold time, notification to inform store manager if quality feedback of task is below threshold, rating for particular personnel based on time to start tasks, time to complete tasks, quality feedback of tasks (consumers/store manager), seek feedback from consumers regarding quality of tasks, provide incentive to consumers to provide quality feedback, provide rating for stores as a combination of the personnel assigned or currently working at the gas station.

Data may be collected by the smart sensors and pushed to the cloud to be analyzed. Such data may include, but may not be limited to: whether the pump is currently open, whether the pump has been opened, whether the pump has been impacted, which customers have been at the pump, when each customer has been at the pump, when an employee has been in close proximity to the pump, when the bioremediation has been dispensed, the amount of bioremediation in the dispensing device at any given time, the location of the bioremediation dispensing unit at any time, including specifically when the bioremediation is being dispensed.

The relevant stakeholder groups that will receive notification alerts and/or data may, for example, include, but may not be limited to store clerks, store managers, CPGs, consumers, and equipment OEMs. As a general rule, each notification trigger and data distribution set discussed in this disclosure can be mapped (one to one [1-1] and/or one to many [1-n]) to each of the delivery channels/mechanisms discussed.

FIG. 1 is a block diagram of a system 100 for monitoring of one or more products. System 110 may provide a monitoring function for a fuel pump at a gas station. Most gas stations have many fuel pumps for example, fuel pump 120. Often, each fuel pump 120 may have a nozzle and an interface on both sides of the fuel pump 120. As such, one car may dispense gasoline on each side of the fuel pump 120. The fuel pumps 120 are often arranged in a parallel array. One vehicle may fuel on each end of the array and two vehicles may fuel between each adjacent set of fuel pumps 120. Sometimes, gas and/or oil will spill onto the pavement forming a collection 112 that needs to be treated by employees of the gas station. Employees are required to check both sides of each pump for collections that need to be treated when notified and/or at regular time intervals. Currently there is no manner of verifying whether the inspection has taken place after the notification or at the regular time intervals. In one implementation of the system, each pump 120 may include a monitoring module, for example attached within the housing of the pump. A first monitoring module 122 may be placed in a first pump 132 and a second monitoring module 124 may be placed in a second pump 134. The monitoring modules 122, 124 may include an accelerometer, a gyroscope, a receiver, and a transmitter. The transmitter and receiver may communicate over multiple communication protocols, for example Bluetooth or Wi-Fi. In addition, the modules 122, 124 may also communicate with a store network 168 via a wired or wireless connection using one of multiple potential protocols, for example, Ethernet, Wi-Fi, or other known communication protocols. In one implementation of the system 110, an application device 114 (e.g. a bioremediation dispensing device) may be provided to a gas station employee. The application device 114 may include the substance for treating the collection 112 of waste (e.g., the gas or oil spill). The application device 114 may include a small module with a transmitter and/or receiver configured to communicate with the pump monitoring modules 122, 124 in each of the fuel pumps 120. Accordingly, based on the strength of the signal between the application device 114 each of the modules 122, 124, the system may verify that the dispensing device 114 has been in close proximity (e.g., right in front of, and/or between), each of the fuel pumps to determine if a collection 112 is present and treat any collections with the agent in the dispensing unit 114. Further, a sensor may be configured to monitor a trigger on the dispensing unit 114 to identify when the agent is deployed onto a collection 112 and communicate and/or how many trigger activations have occurred at each location relative to the monitoring modules 122, 124 in each pump 120. Further, multiple transmitters may be used in each monitoring module 122,124 to triangulate a position of the sensing device 124 relative to each fuel pump.

In addition, the pump monitoring module 122, 124 may communicate with mobile devices 118 of consumers 116 at the pump. The mobile device 118 may for example be a mobile phone, personal digital assistant, or tablet-type device with an application (e.g. a loyalty application) loaded on it. The application may configure to detect and communicate with the pump monitoring module 122, 124. The pump monitoring modules 122, 124 may communicate with the application on the user's mobile device 118 to obtain a user identification which may then be used to communicate with a server (e.g. a loyalty system server). The system may then communicate offers such as coupons that have been approved for the store or location to the user's mobile device over the internet via Wi-Fi, a cellphone network, or other network that is a common means of communication for the mobile device 118. Alternatively, the offers or coupons may be provided via direct communication from the pump monitoring module 122, 124 to the user's mobile device 118 (e.g. over a direct connection using Bluetooth or other wireless personal area networking technology connection, such as may be specified under IEEE 802.15; a wireless local area networking technology, such as Wi-Fi direct or other Wi-Fi communication technology or other technology specified under the IEEE 802.11 standard; various wireless peer-to-peer communication technologies; or other suitable technology for communicating data between two devices within proximity of each other).

Figure 2:
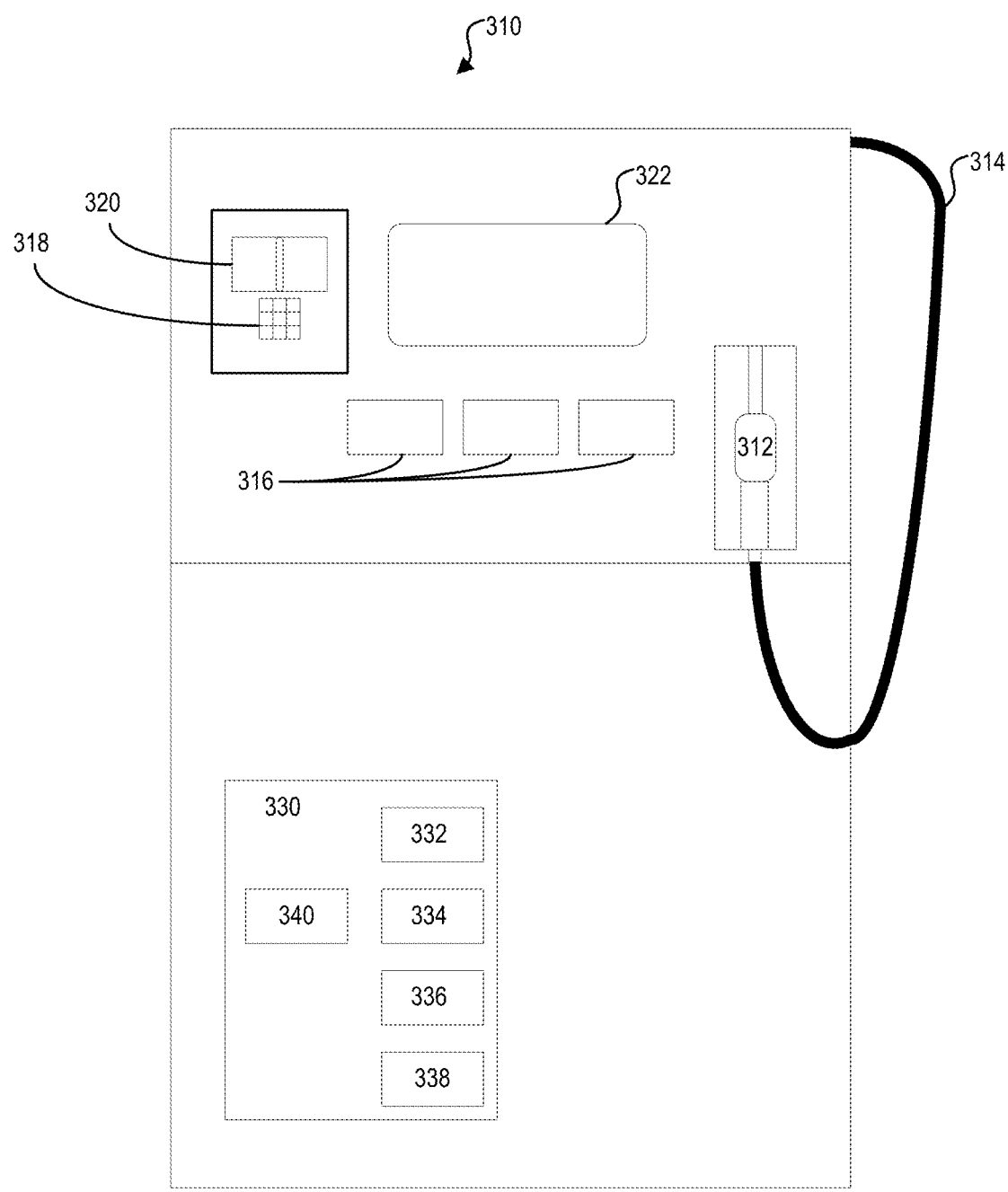
FIG. 2 is a schematic view of a fuel pump.

FIG. 2 is a schematic view of a fuel pump 310. Fuel pump 310 is an example of one implementation of the fuel pumps 120 illustrated in FIG. 1. The fuel pump 310 includes a nozzle 312 for dispensing gasoline and a hose connected to the nozzle for providing gasoline from a tank to the nozzle 312 for dispensing. Although in some scenarios, the fuel pump may take the form of an electric vehicle charging station and the nozzle 312 may be a charging plug that provides an electric current for charging a battery. The fuel pump 310 may include a key pad 318 and a display 322. The key pad 318 and display 322 may be used as a user interface for operation of the pump, as well as, providing entertainment and advertising while the pump is in use. A card reader 320 may be provided for interacting, providing payment information and verification. As discussed later in this application, the key pad 318, the display 322, and the card reader 320, along with any cameras, bio-sensors or microphones may be used for age verification or individual identification purposes as well. The pump 310 may also include fuel grade selection buttons 316 which may be used to select the grade of fuel that is dispensed provided to the hose 314 for dispensing by the nozzle 312. One example of the fuel monitoring module is provided as module 330. The module 330 may include a transmitter and/or receiver 332 (e.g. transceiver), a beacon 334, an acceleration/gyroscope module 336, and a door sensor 338. The beacon 334 and transmitter and/or receiver 332 may, by way of example, utilize Bluetooth or other wireless personal area networking technology connection, such as may be specified under IEEE 802.15; a wireless local area networking technology, such as Wi-Fi direct or other Wi-Fi communication technology or other technology specified under the IEEE 802.11 standard; various wireless peer-to-peer communication technologies; or other suitable technology for communicating data between two devices within proximity of each other.

The gyroscope/acceleration module 336 may provide sensing to determine if the pump is jolted or jarred, hit by a person or vehicle, or even opened and closed indicating that the pump may have been tampered with. Similarly, a door sensor 338 (e.g. a magnetic switch or position sensor) may be used to determine if the door has been opened. Logic may be provided in the circuit of the pump or within the servers to generate an alert or schedule a task based on certain conditions, for example the severity of vibrations, duration of vibration, or the time of day of the vibrations, as well as any combination of these conditions or other conditions. If the pump may have been tampered with, the fuel pump monitoring module may communicate with a server 120, for example through a network 168 to generate an alert and schedule a task for an employee or manager to check the condition of the pump where the disturbance has been sensed. In some implementations, the server may be configured to contact a government authority such as the police or a fire department to alert the proper authorities regarding a potential threat. In some implementations, server 120 may be configured to acquire and forward video information containing a view of the pump at the time of the sensed event and transmit the video to a supervisor, corporate entity, or a governmental agency.

In some implementations, the pump monitoring module 330 may communicate with a consumer mobile device through the transceiver 332 or the beacon 334 to determine a user identity and possible user profile characteristics. The user profile characteristics may be communicated directly from the mobile device to the pump monitoring module 330 through the transceiver 332 or the beacon 334. Alternatively, the pump monitoring device 330 may use the user account ID to communicate with a loyalty server and retrieve the user profile characteristics. Alternatively, the application on the user device may sense the beacon 334 and communicate the loyalty server to provide the ID of the beacon or pump monitor device 330. Then the loyalty server may push the user profile characteristics to the pump 310 and possibly the pump monitoring device 330. The pump 310 may then use the display 322 to display content that is customized to the user based on the user account characteristics.

The customized content may include an individualized offer or coupon. The customized content may include programming on the display that is of particular interest to the user based on the user account. For example, the user account may include category designations of interest to the user based on user selection. The category designations may be transmitted from the loyalty server to the fuel pump 310. The fuel pump 310 may then access and display content that has been classified in the category designations associated with the user profile. The category designations may be added to the user profile in response to past purchases made within the store and communicated by the POS system to a loyalty server.

Another transceiver or beacon may be located within the store. Accordingly, the server may collect data regarding user profile characteristics for a particular user account and the actions taken at the pump, for example the video displayed on the screen in response to the user account characteristics, and/or the coupons or offers provided from the application on the user's mobile device to determine which actions result in users making it from the pump into the store.

Pump monitoring device 330 may include a magnetic device for sensing when the door is opened or closed. Further, the components of the pump monitoring module may be fastened onto a substrate such as a PCB board. The PCB board may be covered in a housing and the housing may be attached a pump structure. For example, the monitoring module may be attached to the frame of the pump, an internal board of the pump, or to the door of the pump. The monitoring module may be attached using fasteners such as bolts, screws, clamps, zip ties, or through a magnetic attachment interface for example, a magnet that is clamped or attached to the housing of the pump monitoring module using an adhesive. In addition, the pump monitoring module may have a vibration sensor. In addition, the pump monitoring module may be battery powered such that the pump monitoring module may remain active when the power to the fuel pump has been shut down. Often times power to the pumps are shut down during the evening when a store is closed and no employees are present. The battery may be charged by electricity provided to the pump via wiring during the day or through a solar panel attached to the pump.

The pump monitoring device may have a circuit 340 (e.g. a processor) for analyzing each of the sensors and acting upon data received by the fuel pump monitoring module. The circuit may include a communication interface for communicating with servers (e.g. a task server) through one or more networks.

In some implementations, the pump monitoring module may have a listening device for example, a microphone that is configured to record sound in the area. A listening device may have a limited memory and therefore may record for a certain time period and then record over previously recorded sound. In another implementation, the listening device may be activated by sensor signals from the pump monitoring device. For example, the listening device may be activated in response to an acceleration signal from the accelerometer in the pump or from the magnetic door opening sensor. In some implementations, the pump monitoring module may also include a camera on the module to record a view of the inside of the pump. The camera on the inside of the pump may also be activated by various sensor signals from the pump monitoring device as described above with regard to the listening device. Further, in some implementations, a camera outside of the pump for example, the head of the pump may be activated to record video with the pump in the field of view in response to sensor signals from the pump monitoring module. The video and sound from the pump monitoring module may be available remotely (e.g. by streaming) accessible through the alert. For example, the alert may have a link to the streaming audio and/or video or a specialty application may provide access.

As discussed elsewhere in this application, the transceiver or Bluetooth beacon in the pump monitoring module 330 may communicate with a bioremediation dispensing device. The pump monitoring module 330 may determine the location and use of the bioremediation dispensing device relative to the pump monitoring module 330. In some implementations, the employee badge or an application of the employees phone or tablet device may interact with the pump monitoring module 330 to identify that the employee has visually inspected each area around each pump to see if the bioremediation is needed for a deposit or fuel or gas. The employee badge, phone or tablet device may utilize NFC, RFID, IR, Bluetooth or other wireless communication technology.

Figure 3:
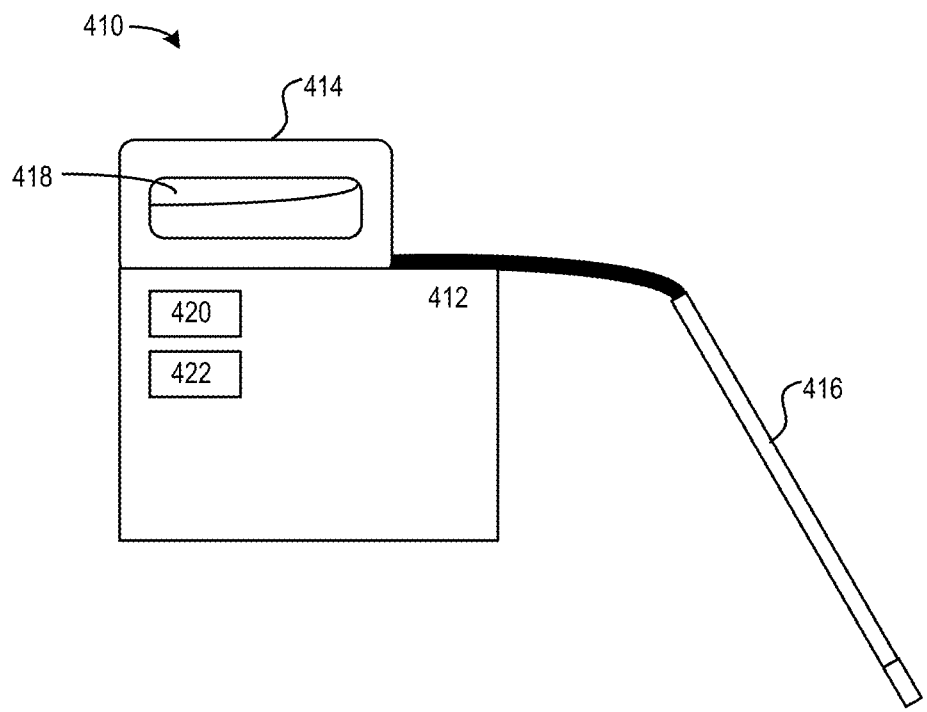
FIG. 3 is an illustration of a bioremediation dispensing unit.

FIG. 3 is an illustration of a bioremediation dispensing unit 410. The bioremediation dispensing unit 410 may include a tank or cavity 412 for storing the bioremediation. The bioremediation may be stored in different forms for example, liquid, gas, or powder. The dispensing unit may include a handle 414 for carrying the dispensing unit. A trigger 418 may be provided to actuate dispensing of the bioremediation. In some implementations, the trigger 418 may be located on the handle 414. Actuating the trigger 418 can cause the bioremediation to travel from the tank 412 to a nozzle 416 for example, a dispensing wand. The dispensing unit may include an electronic circuit 420. The electronic circuit 420 may include a transmitter (e.g. a transceiver) for communicating with the fuel pump monitoring module. The transmitter may be a Bluetooth transmitter and may transmit information such as a dispensing unit ID.

The circuit 420 may also include a receiver which may be implemented as a transceiver. The receiver may receive information from the pump monitoring module and store such information in a memory for later use and/or reporting. The bioremediation dispensing unit 410 may also include a sensor 422 for determining when the trigger 418 has been actuated to dispense the bioremediation. The sensor 422 may also include a bioremediation level sensor. The bioremediation level sensor may determine the amount of bioremediation in the tank 412 and therefore may monitor the dispensing amount of bioremediation relative to time and also relative to the proximity to each pump based on the communication with the pump monitoring module through the circuit 420. In some implementations, the distance in relation to the pump monitoring module may be based on signal strength. In some implementations, the triggering and/or the signal from the bioremediation level sensor may be communicated through the transmitter of circuit 420 to the pump monitoring module for logging and/or reporting to the server for further analysis. The bioremediation dispensing unit 410 may include a battery and the circuit 420 may determine a battery level and transmit the battery level to the fuel pump monitoring module, which may be used to alert the storm manager to change the charge the battery and/or may be used in the calculation of the distance between the pump monitoring module and the bioremediation dispensing unit 410.

Upon receiving the data from the sensors, the server 120 may store the data locally in a storage device 122. The server may also analyze the data and determine certain thresholds based on the characteristics of the sensor exceeding a certain value, or based on the comparison between various sensors, or based on an alert provided from a particular sensor the server 120 may communicate with a mobile device 166 that may be configured with an application for notifying a store clerk with an action needed to be taken with regard to inspecting the fuel pumps, area around the fuel pumps for deposits, or dispensing bioremediation. In addition, the server 120 may communicate with a mobile device 167 from a consumer based on an application loaded on the mobile device 167.

The application may allow the user to receive communication from a local network within the store 110. The application may allow the mobile device 167 to provide a user interface to present offers and/or electronic coupons to the consumer in response to the characteristics monitored by the smart sensors and/or a comparison of the smart sensors and/or a comparison of the monitored data with a threshold. In addition, the server 120 may be in communication with a display device 170 located within the store or on the premises as noted by box 172. The display 170 may be a public display, for example, a monitored unit or sign display to provide an offer or message to a consumer in response to the user profile information obtained in response to the fuel pump monitoring module. The server 120 may communicate with an external server 174 located in a remote location such as corporate headquarters. The server 174 may receive data from the server 120. The server 120 may push the data to the server 174 and/or, the server 174 may request the data from the server 120. The data may be streamed in real time to the server 174 or accumulated and provided in batches, for example, after the store is closed or in the late evening hours. Further, certain data may be provided at different times based on a data priority. For example, alerts that a characteristic exceeded a certain threshold may generate a message that is immediately transmitted from server 120 to server 174 whereas the actual monitored data may be transmitted at a later time as a different priority. The data that the server 174 may be stored in a data storage unit 176 and may be retrieved by server 174 or other servers for additional data analysis. The server 174 may communicate via a network 178 with various other devices. For example, server 174 may communicate with a billboard display 182. The billboard display may display the characteristics that are monitored by the fuel pump monitoring unit. In addition, the billboard display may provide customized information on the billboard display based on customer account accessed by the fuel pump monitoring module. The billboard display may also include content associated with the categories in the consumers profile, further, the billboard could personally thank the consumer using their name or a nickname associated with their user profile.

The server 174 may communicate with an equipment OEM or repair facility 184. The server 174 may communicate with the equipment OEM or repair request system 184 to request maintenance, for example on a fuel pump or display. Further the system 174 may generate an offer such as an electronic coupon and send the electronic coupon to a user device 180 based on the user profile information accessed by the fuel pump monitoring module and stored on the server 174 or the remote device 180, the location information related to the electronic device 184 other factors.

Store Clerk

The store clerk may receive notifications for various situations. The determination to transmit the notification may be in the server 120 located in the store 110 and/or by the remote server 174. In some implementations, the circuit 340 in the pump 310 may make the determination to transmit the notification. The store clerk may receive notifications on a mobile or display device through a local network via server 120. The store clerk may receive notifications on various devices through a wide area network via server 120 or remote server 174.

The system may generate, collect and monitor data related to tasks assigned to personnel. The data may include notification of a task. (via email, text, website, app, other smart device (e.g. name badge), voice to headset, etc., accept task employee ID, accept task time, presentation of task location, presentation of task description/check list, assistance notification, notification from personnel task has been completed, confirmation from sensor system that task has been completed, provide rating for particular personnel based on time to start tasks, time to complete tasks, quality feedback of tasks (consumers/store manager).

Fuel pump notifications may be triggered or tasks may be generated in response to various events such as, accelerometer on fuel pump monitoring module is above an acceleration threshold, a magnetic, optical, or physical switch detect that the fuel pump door has been opened, a customer mobile device is detected by the transceiver or Bluetooth beacon, the location of the bioremediation dispenser, the trigger of dispensing of the bioremediation of a bioremediation dispenser, the fill level of a bioremediation dispenser, an amount of time since a bioremediation dispenser has been detected in the proximity of a fuel pump, an amount of time since an employee tag or mobile device has been detected in the proximity of a fuel pump. Logic may be provided in the circuit of the pump or within the servers to generate an alert or schedule a task based on certain conditions, for example the severity of vibrations, duration of vibration, or the time of day of the vibrations, as well as any combination of these conditions, the conditions mentioned above or other conditions.

Individual notification triggers can be delivered via any or all of a POS system, Tablet App, Smartphone (App, SMS), Smartwatch (E-Mail), other wearable devices (E-mail, App, notification, SMS). General data may be distributed at the defined frequency, distributed based on a trigger or threshold being exceeded, and accessible any time in dashboard form via any or all of POS system, Tablet App, Smartphone (App, SMS link to Web landing), or voice command system.

Additional data sources that are potentially relevant for the store clerks may include Corporate systems (compliance info, updated process guidelines, other information), CPG systems (offer availability), POS data (consumer purchasing history). Potentially amended process/use case for store clerks may include updated compliance information being sent from corporate systems to the store and, in combination with data sent from the fuel pump monitoring module. If the user profile is accessed at by the fuel pump monitoring module, the store clerk may be prompted to open an offer dashboard provided by a CPG (Coca-Cola) system, check if an offer is available and, if so, volunteer to the consumer that the offer is available. Another process may include the clerk receiving alert when a purchaser particularly interested in a particular product (based on user profile or preference history) is located at the fuel pump. The clerk may be prompted to talk to the consumer over an intercom integrated into the pump and take an order, the clerk may then deliver the items to the consumer at the pump.

Store Manager

The store manager may receive notifications for various situations. The determination to transmit the notification may be in the server 120 located in the store 110 and/or by the remote server 174. In some implementations, the circuit 340 in the pump 310 may make the determination to transmit the notification. The store manager may receive notifications on a mobile or display device through a local network via server 120. The store manager may receive notifications on various devices through a wide area network via server 120 or remote server 174.

The system may generate, collect and monitor data related to tasks assigned to personnel. The data may include receiving assistance request from personnel attending to task, seek feedback from store manager regarding quality of tasks, provide incentive to consumers to provide quality feedback, provide rating for particular personnel based on time to start tasks, time to complete tasks, quality feedback of tasks (consumers/store manager), inform store manager if time to complete task has exceeded a threshold time, inform store manager if quality feedback of task is below threshold.

Fuel pump notifications may be triggered or tasks may be generated in response to various events such as, accelerometer on fuel pump monitoring module is above an acceleration threshold, a magnetic, optical, or physical switch detect that the fuel pump door has been opened, a customer mobile device is detected by the transceiver or Bluetooth beacon, the location of the bioremediation dispenser, the trigger of dispensing of the bioremediation from a bioremediation dispenser, the fill level of a bioremediation dispenser, an amount of time since a bioremediation dispenser has been detected in the proximity of a fuel pump, an amount of time since an employee tag or mobile device has been detected in the proximity of a fuel pump.

Additional collected data from the sensors may be delivered at defined time/time interval(s) and analyzed for sending additional notifications or tasks generated based on a exceeding a threshold (upper, lower, or based on a comparison) of one or more of number of notification triggers and their type, time to corrective action, completed tasks over defined time period, Individual notification triggers can be delivered via any or all of POS system, Tablet App, Smartphone (App, SMS), Smartwatch (App, SMS), Other wearable devices (E-mail, App, notification, SMS), Desktop PC (E-Mail, Web Landing Page), Laptop PC (E-Mail, Web Landing Page). General data may be distributed at the defined frequency, distributed based on a trigger or threshold being exceeded, and accessible any time in dashboard form via any or all of POS system, Tablet App, Smartphone (App, SMS link to Web landing), Smartwatch (App, SMS link to Web landing), Other wearable devices (E-mail, App, notification, SMS), Desktop PC (E-Mail, Web Landing Page), Laptop PC (E-Mail, Web Landing Page), or voice command system.

Additional data sources that are potentially relevant for the store managers may include Corporate systems (compliance info, updated process guidelines, other), CPG systems (offer availability), Store systems (clerk performance history), POS system (consumer purchasing history). Potentially amended process/use case for store managers may include updated compliance information being sent from corporate systems to the store and, in combination with data sent from sensor device(s). Another process may include generating information accessible in dashboard form for manager to pull down. For example based on user profile data accessed by the fuel pump monitoring module, the manager may be presented with a interface to 'activate' an offer that is relevant in select stores for a certain period. Another process may include generating dashboard reports for fuel pump monitoring module, pushed to the manager at a defined frequency, that provide info, graphics, and/or alerts around sensor management and compliance can be a key data point that is used in combination with other clerk performance data to enhance the performance appraisal process.

CPGs

The CPGs or food service vendors may receive notifications for various situations. The determination to transmit the notification may be in the server 120 located in the store 110 and/or by the remote server 174. In some implementations, the circuit 340 in the pump 310 may make the determination to transmit the notification. The CPGs or food service vendors may receive notifications on a mobile or display device through a local network via server 120. The CPGs may receive notifications on various devices through a wide area network via server 120 or remote server 174.

Individual notification triggers can be delivered via any or all of POS system, Tablet App, Smartphone (App, SMS), Smartwatch (App, SMS), Other wearable devices (E-mail, App, notification, SMS), Desktop PC (E-Mail, Web Landing Page), Laptop PC (E-Mail, Web Landing Page). General data may be distributed at the defined frequency, distributed based on a trigger or threshold being exceeded, and accessible any time in dashboard form via any or all of POS system, Tablet App, Smartphone (App, SMS link to Web landing), Smartwatch (App, SMS link to Web landing), Other wearable devices (E-mail, App, notification, SMS), Desktop PC (E-Mail, Web Landing Page), Laptop PC (E-Mail, Web Landing Page), or voice command system.

Consumers

The consumers may receive notifications for various situations. The notifications may be informational or may be in the form of coupons (e.g. digital coupons based on the captured sensor information). The determination to transmit the notification may be in the server 120 located in the store 110 and/or by the remote server 174. In some implementations, the circuit 340 in the pump 310 may make the determination to transmit the notification. The consumers may receive notifications on a mobile or display device through a local network via server 120. The consumers may receive notifications on various devices through a wide area network via server 120 or remote server 174.

Fuel pump notifications may be triggered or tasks may be generated in response to various events such as, accelerometer on fuel pump monitoring module is above an acceleration threshold, a magnetic, optical, or physical switch detect that the fuel pump door has been opened, a customer mobile device is detected by the transceiver or Bluetooth beacon, the location of the bioremediation dispenser, the trigger of dispensing of the bioremediation from a bioremediation dispenser, the fill level of a bioremediation dispenser, an amount of time since a bioremediation dispenser has been detected in the proximity of a fuel pump, an amount of time since an employee tag or mobile device has been detected in the proximity of a fuel pump.

Individual notification triggers can be delivered via any or all of an Electronic LED, Tablet App, Smartphone (App, SMS), Smartwatch (App, SMS), Other wearable devices (E-mail, App, notification, SMS), Smart car infotainment (App, Alert). General data may be distributed at the defined frequency and accessible any time via any or all of an Electronic LED, Tablet App, Smartphone (App, SMS link to Web landing), Smartwatch (App, SMS link to Web landing), Desktop PC (E-Mail, Web Landing Page), Laptop PC (E-Mail, Web Landing Page), or voice command system.

Equipment OEMs

The equipment OEMs or repair services may receive notifications for various situations. The determination to transmit the notification may be in the server 120 located in the store 110 and/or by the remote server 174. The equipment OEMs or repair services may receive notifications on a mobile or display device through a local network via server 120. The equipment OEMs or repair services may receive notifications on various devices through a wide area network via server 120 or remote server 174. Notifications may be triggered based on events such as maintenance failure or work order request required, The fuel pump being impacted (as determined by the accelerometer exceeding a threshold acceleration), the pump door being opened, the battery status of a fuel pump monitoring module.

Additional collected data from the sensors may be delivered at defined time/time interval(s) and analyzed for sending additional notifications based on a exceeding a threshold (upper, lower, or based on a comparison) of one or more of bioremediation fill level, rate of bioremediation dispensing.

Individual notification triggers can be delivered via any or all of, Tablet App, Smartphone (App, SMS), Smartwatch (App, SMS), Desktop PC (E-Mail, Web Landing Page), Laptop PC (E-Mail, Web Landing Page). General data may be distributed at the defined frequency, distributed based on a trigger or threshold being exceeded, and accessible any time in dashboard form via any or all of Tablet App, Smartphone (App, SMS link to Web landing), Smartwatch (App, SMS link to Web landing), Desktop PC (E-Mail, Web Landing Page), Laptop PC (E-Mail, Web Landing Page), or voice command system.

The server 120 and/or server 174 includes communication interfaces 202, system circuitry 204, input/output (I/O) interfaces 206, and display circuitry 208 that generates user interfaces 210 locally or for remote display, e.g., in a web browser running on a local or remote machine through which a project is defined and resources are selected, evaluated, allocated, and connected to a project. The user interfaces 210 and the I/O interfaces 206 may include graphical user interfaces (GUIs), touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include any combination of hardware, software, firmware, or other circuitry. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality in the server 120 and/or server 174. As just one example, the system circuitry 204 may include one or more instruction processors 218 and memories 220. The memory 220 stores, for example, control instructions 222 and an operating system 224. In one implementation, the processor 218 executes the control instructions 222 and the operating system 224 to carry out any desired functionality for the server 120 and/or server 174. The control parameters 226 provide and specify configuration and operating options for the control instructions 222, operating system 224, and other functionality of the server 120 and/or server 174.

The server 120 and/or server 174 may include a local data repository 232 that includes volume storage devices, e.g., hard disk drives (HDDs) and solid state disk drives (SDDs). The storage devices may define and store databases that the control instructions 222 access, e.g., through a database control system, to perform the functionality implemented in the control instructions 222. In the example shown, the databases include a resource data database 228 and a project data database 230. In other implementations, any of the databases may be part of a single database structure, and, more generally, may be implemented logically or physically in many different ways. Each of the databases defines tables storing records that the control instructions 222 read, write, delete, and modify to perform the processing noted below. The resources descriptors may maintain their own resource descriptor data repositories. The system circuitry 204 may implement the resource analysis circuitry 114, project platform circuitry 116, and the operator control circuitry 118, e.g., as control instructions 222 executed by the processor 218.

The thresholds and alerts may be stored in one or more data bases and may be associated with the product or the fuel pump monitoring modules or the bioremediation dispensing units. For example, separate thresholds for each product characteristic such as location, fill level and time may be stored for each device type in a device record. Separate thresholds for each characteristic may be stored for each fuel pump monitoring module or bioremediation dispensing device in a unit record.

Similar offers such as electronic coupons, in store advertisements or POS offers may be stored in records related to the user profile. Further, the offers may be generated and/or delivered in response to characteristics from the user profile. Redemptions of electronic coupons and or purchases corresponding with in store advertisements may be tracked and analyzed with respect to the characteristics that were used to generate and/or deliver the offer. As such, the usefulness of the offers may be maximized. This may even be controlled in a feedback loop where the thresholds are adjusted based on redemption data and/or purchase correlation data.

As noted above, the pump monitoring system may include one or more databases. One example of the one or more databases is provided in FIG. 4. The one or more databases may include records for each employee. For example, the one or more databases may include a table 510 of records for each employee. The record for each employee may include fields such as an employee ID, a name, one or more time in entries, one or more time out entries, one more assigned tasks, a pay rate, a rating, an employee type.

The employee ID may be unique identifier for example a numeric or alpha numeric code. The one or more time in entries may be the times and/or dates that the employee enters the gas station or "clocks in" to work a shift. The one or more time out entries may be the times and/or dates that the employee leaves the store or "clocks out" of the shift. The time in entries and time out entries may be based on an radio frequency card or name badge, a mobile device (e.g. mobile phone, pda, music player), or punching in a time clock (e.g. with a time card or digitally, for example using a point of sale system). The tasks may be short projects (e.g. things to do or take care of) to keep the store running efficiently. The tasks may be scheduled or unscheduled tasks. Scheduled tasks may include short projects that are triggered by specific times or regular time intervals such as, inspecting areas proximate the fuel pumps for deposits of gas or oil. Unscheduled tasks may include short projects that are triggered by some sensing or real time tracking mechanism. For example, if the pump monitoring system identifies that the fuel pump door has been opened, or identifies that a particular consumer is at the fuel pump or may be entering the store.

The pay rate may be the amount of money the store pays the employee for a particular time interval (e.g. dollars per hour). However, the pay rate may include any overhead expenses, such as any benefits. Alternatively, a separate loaded rate could be provided that includes overhead. The employee rating is an indication of performance of the employee. The rating may include a composite number that covers all categories and separate ratings for particular categories (e.g. timeliness, customer service, etc.). The employee type may be a job title and may indicate that the employee has been trained to perform certain tasks. For example, a cashier may be trained to perform transactions with the POS system. A clerk may be trained to perform transactions with the POS system and also may perform certain types of maintenance items like inspecting areas proximate the fuel pumps to identify deposits and apply a bioremediation to the deposits. A manager may be trained on all systems within the gas station.

A sub table may be formed for each employee that includes each task that was assigned to them for a given evaluation period. The rating for each employee may be calculated based on a function of the number of tasks, time to complete task, task priority, satisfaction scores related to the employee or their tasks. The task priority may provide an indication of the order in which the tasks are to be performed. The task priority may be based on many factors including other pending tasks, line queues (e.g. from a line queue monitor), or particular sensors inputs discussed elsewhere in this application. Satisfaction scores may be scores provided from consumers on a satisfaction report that are associated with a particular employee or a time period during which the employee worked. Satisfaction scores may be for satisfaction reports from managers or other teammates as well. The satisfaction score may include a composite number that covers all categories and separate ratings for particular categories (e.g. timeliness, customer service, etc.).

The one or more databases may include records for each task. For example, the one or more databases may include a table 512 of records for each task. The record for each task may include fields such as an task ID, task type, store location, time start, a time complete, an task priority, an employee assigned to an task, a product associated with the task, alarm rules for the task, employee cost, waste cost, and offer rules.

The task ID may be unique identifier for example a numeric or alpha numeric code that indicates a particular task. The task type may be the type of task from a predetermined list of categories (e.g. cleaning, stocking, food preparation, etc.). The task type may be matched to a job description of an employee type who is currently working. If the task type does not match with an employee type currently working an alert may be generated (e.g. to the store manager). The store location may be an unique identifier that indicates the particular store for which the task is generated, for example a unique numeric or alpha numeric code.

The time start is the time and/or date that the task was initiated or that notification was provided to the employee.

The time to complete may be the time that was taken to complete the task or the time taken so far if the task is not yet completed. The task priority may provide an indication of the order in which the tasks are to be performed. The task priority may be based on many factors including other pending tasks, line queues (e.g. from a line queue monitor), or particular sensors inputs discussed elsewhere in this application.

The employee assigned to the task may be responsible for completing the task, the assignment of the task to the employee may be based on the number of tasks assigned to that or other employees, the qualifications of the employee, the priority of the task, etc. Further, the system may assign tasks based on the rating assigned to an employee and may assign tasks based on previous tasks completed or satisfaction scores related to a particular type of task.

The product associated with the task may be based on information from the point of sale system, a user profile accessed by the fuel pump monitoring module, or based on a sensor being associated with a particular product or equipment within which the product is housed (e.g. the milk refrigerator, the hot dog grill, frozen drink machine, fountain drink machine). The alarm rules may be based on the type of task, the product, or the type of machine associated with the task. For example, alert a manager or a store employee if the fridge door has been opened longer than a specified period of time. In another example, alert a manager or a store employee for restocking if fewer than a threshold number or amount of a product is available for purchase.

The employee cost may be the cost of having a particular employee perform the task based on factors such as the pay rate of that employee, the time taken to complete the task, and/or other entries described above. The waste cost may be the amount of product that has to be discarded based on the task or a fine that may be assessed if the task is not performed (e.g. bioremediation applied to a deposit of oil and gas). Offer rules may be offers that are generated and displayed in the store or sent to customers. The offer rules may be based on the task, type of task, the product, the type of machine associated with the task, other related products available in the store, etc. In one example, consumers may be offered discounts on an item where the item highlighted as a preferred category in the user profile. In another example, consumers may be offered discounts on an item where it is reaching an expiration time or restocking time. In another example, a discount can be offered on a related product if a particular product is not available or is in low supply (e.g. below a threshold).

Some tasks may be tasks that are generated based on sensor input, for example, the fuel pump door has been opened and it needs to be inspected. Some tasks may be generated based on a timer, for example, coffee may be thrown out if it is more than one hour old. Some tasks may be generated based on point of sale information, for example, restocking a particular product like hot dogs on the grill. A task may be generated based on any of the alerts or notifications described throughout this notification. The task may be to fix the deficiency or error related to the alert or notification. Alternatively, the task may be to provide certain offers or incentives.

A sub table 516 may be formed for each product that includes records for each task that was associate with the product for a given evaluation period. Each record may include the product, each task, the waste, any offers generate, the number of units sold. The waste may be a cost or number of the product that is not sold but for example must be discarded due to expiration or employee error. The table may track the number of units and/or the amount sold. Further, the offers that are generated may be tracked which provide discounts to consumers. In addition, profitability for a product may be determined for each unit of the product based on the above and other factors. A rating may be generated for each product indicating the profitability for each product for a particular location, or group of locations. The rating for a product may be calculated based on a function of the number of tasks, waste, offers, and units sold.

The one or more databases may include records for customer satisfaction. For example, the one or more databases may include a table 514 of records for each customer satisfaction report. The record for each customer satisfaction may include fields such as a satisfaction report ID, a store location, satisfaction score, time associated with the report, tasks associated with the report, employees associated with the report, details, offer rules. The satisfaction report ID may be unique identifier for example a numeric or alpha numeric code that indicates a satisfaction report. The store location may be an unique identifier that indicates the particular store for which the task is generated, for example a unique numeric or alpha numeric code. Satisfaction scores may be scores provided from consumers on a satisfaction report that are associated with a particular employee or a time period during which the employee worked. Satisfaction scores may be for satisfaction reports from managers or other teammates as well. The satisfaction score may include a composite number that covers all categories and separate ratings for particular categories (e.g. timeliness, customer service, etc.). Time associated with the satisfaction report may be used to determine the time frame to which the report is related. The time frame may be used to match tasks to the report using the task start or complete time. The time frame may be used to match employees to the report based on time in and time out entries. Various detail entries may be available allow the user to expand on their experience and may be used for human interpretation of the experience. Additionally, offer rules may be attached to the satisfaction report to provide discounts to consumers based on the satisfaction report. For example, if the consumer fills out a survey regarding the cleanliness of the fuel pump area, the consumer may be offered a discount on an item. In another example, a consumer may be offered a discount for a category of product highlighted on the user profile accessed by the fuel pump module, if the consumer enters the store. The offer may be provided to an application on the consumers mobile device, to the display on the fuel pump, or be offered to the consumer audibly over a speaker on the fuel pump (e.g. automatically by the fuel pump monitoring module or by a store clerk in response to a generated task).

Figure 5:
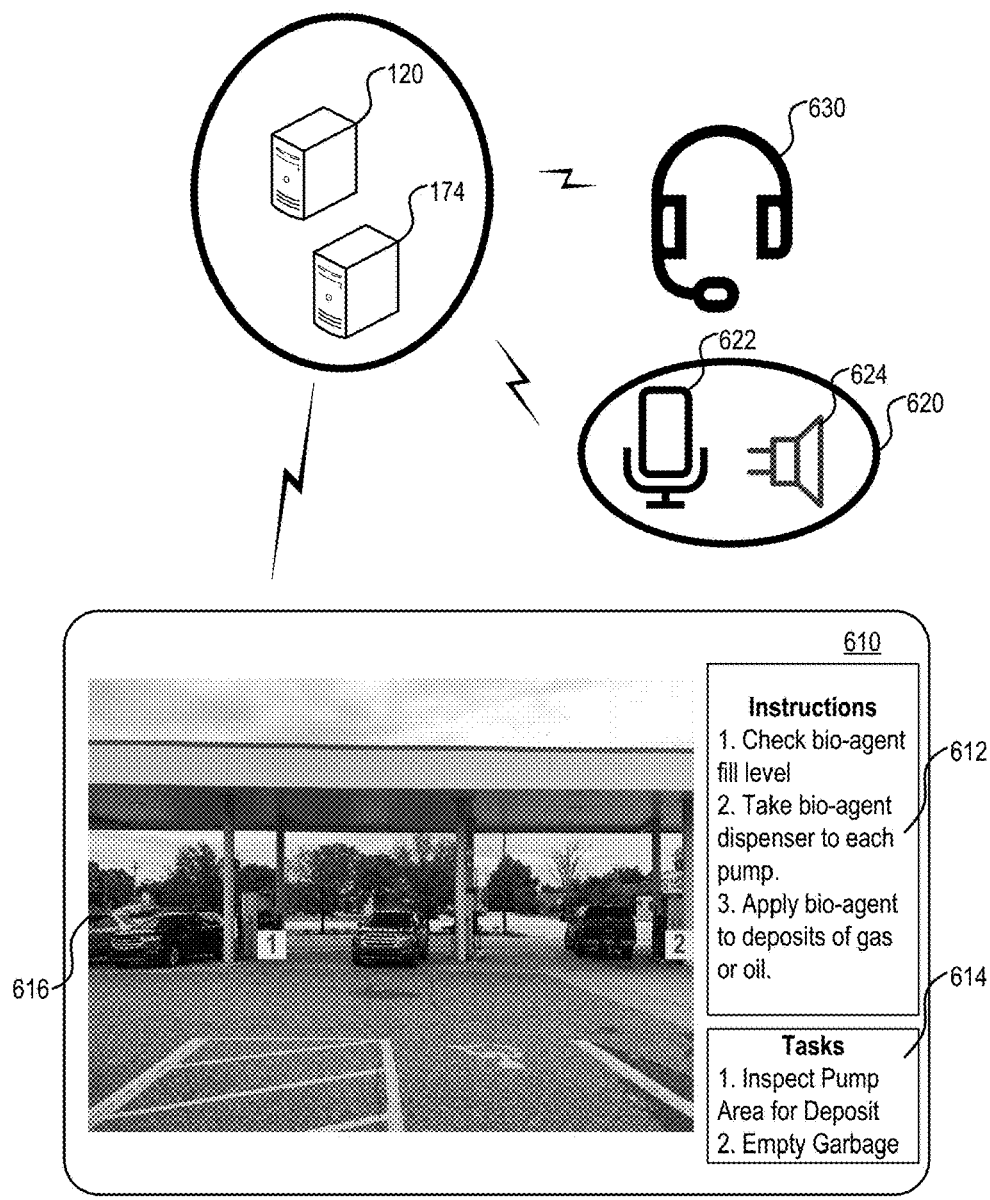
FIG. 5 is an illustration of a display for a pump monitoring system.

FIG. 5 is an illustration of a display device for a fuel pump monitoring system. The device 610 may be any one of the notification devices mentioned throughout this application, including any or all of POS system, Tablet, Smartphone, Smartwatch, Other wearable devices, Desktop PC, Laptop PC, etc. The display may include a list of tasks 614 to be completed. The tasks may be clickable, for example, links may be provided that display more information about each task. The display may include a list of instructions 612 on how to complete the task. The display may by default show the current task (e.g. first on the task list). However, directions may be switched to any task that is selected from the task list. The display may include a map 616 indicating the location of one or more tasks to be completed. In one example, only the current task location is marked with an indicator. In other implementations, different indicators may be used for the location for each task. In one example, the location may be marked with a number corresponding to the task number. For example, inspecting a fuel pump door that has been recently opened as determined by the fuel pump monitoring module is the current task, for example, the first task on the list. As such, the instructions for making inspecting the pump area for deposits may be displayed on the screen and the locations to be inspected are marked on the map. The second task is to empty garbages, as such the garbages are marked on the map. The indicators may be overlaid on one or more pictures of the actual store in which the employee is working, thereby simplifying and clarifying the task for the employee. The employee may be logged into the device or application such that the map, tasks, or instructions may be those specifically related to the employee that is currently logged in.

The system may also include a microphone 622 and speaker 624 for voice command operation. The microphone 622 and speaker 624 may be integrated into a wearable headset assembly 630. Alternatively, the microphone 622 and speaker 624 may be in a small counter top assembly 620. In another example, the speaker and microphone may be utilized in a personal mobile device, such as a tablet, mobile phone or portable music player. The store clerk may receive instructions via automated verbal commands generated in response to tasks in the database. Further, verbal responses may be provided by the store clerk through the microphone, for example, using voice recognition technology. The particular store clerk may be identified by a device being used by the store clerk. For example, the store clerk may be logged into an application on that device, e.g. the clerk's mobile phone. In some instances, voice messages may be provided to the clerk through the speaker and the clerk may respond through an user interface on the display device. Any of the devices mentioned above may be in communication with the server 120 or server 174 to receive or transmit voice messages related to generated tasks.

As such, the system may send a broadcast message to multiple employees reporting a task to be completed. The system may determine who issues a voice response to accept the task by either determining which device (e.g. logon) responds or by performing voice recognition to identify the voice of the clerk. In another example, the system may select a clerk to which the task is assigned and generate a voice message to the particular clerk to which the task is assigned. The system may then wait for a voice response from the clerk to which the task is assigned whether the task is accepted or rejected. If the task is rejected or a response is not received within a given time period, the system may reassign the task to another clerk. If the task is accepted, the system may also wait for a voice response when the task has been completed. The system may also request statistics, such as quantity or type information, or maintenance information. The clerk may provide any requested information, but may also issue a help or assistance command to generate a task for a store manager or a service provider (such as a maintenance person).

In one example, the system may generate a voice command in response to a task to make a new pot of coffee. The clerk may speak a voice response that the task is accepted, which is received by the system processor. The processor may wait for a voice response from the clerk that the task is complete (e.g. the coffee has been made). If the task complete response is not received within a given time period, the processor may issue a verbal reminder to the clerk to which the task is assigned. In some instances, each step in the directions may be verbally provided through the speaker. The clerk may confirm completion after each step before the next step is read. Additional commands like repeat may be used to verbally provide the last instruction again.

In some instances, voice messages may be generated in response to tasks. In one example, the voice message may be an offer to a consumer. For example, after a task has been completed to make coffee, a voice message may be generated offering a discount to a consumer through an app on their phone or through a speaker mounted on or near the coffee machine. The message may say "please have a fresh cup of coffee, brewed only two minutes ago." Further, the message may be generated in response to customer profile information, if the system senses the identity or location of a consumer within the store (e.g. through a loyalty app). The pump monitoring module may provide the message to the consumer though a speaker at the pump if the pump monitoring module identifies the product as a preference in the accessed user profile. In some instances, the message may be provided to the clerk instructing the clerk to offer a discount on the coffee based on the task or consumer profile information. Similarly, the system may remind (e.g. verbally through the speaker or through the display) the clerk of a consumer name and/or rewards status based on the profile information, so that the clerk may appropriately greet the consumer by name and thank them for their loyalty in relation to their rewards status.

In another example, the voice message to the consumer or clerk may be based on maintenance or appliance information. For example, "please try coffee from our new coffee maker at a 50% discount." In another example, an OEM manufacturer or maintenance person may provide maintenance information during repairs. For example, the system may request and the maintenance person may provide information about cleaning, what parts are replaced, appliance up time, appliance down time, cause of failure, etc.

The store clerk and delivery person may use voice commands to verify and reconcile inventory information. The delivery person may speak the amount of each item delivered. The clerk can also speak the amount of inventory delivered and may speak the amount left on the shelf. This information may be used to verify inventory information (e.g. for ordering and POS tracking) and may be used reconcile bill for the delivered items with the product supplier.

Figure 6:
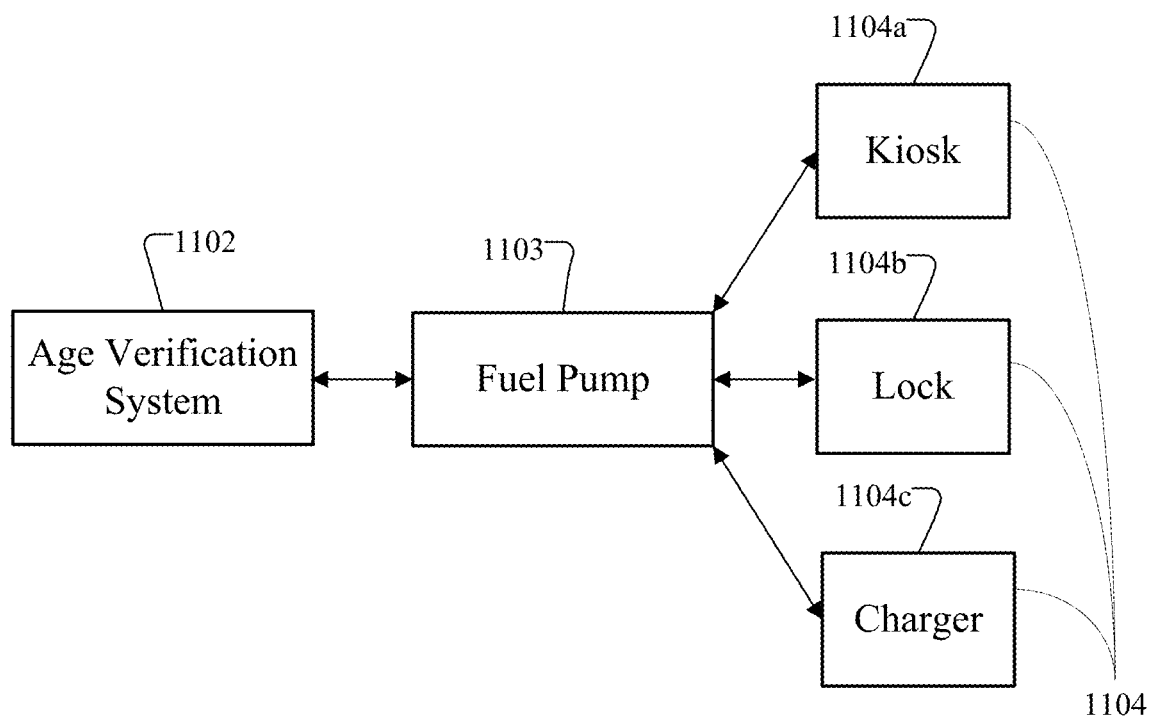
FIG. 6 is a block diagram illustrating age verification by the fuel pump.

FIG. 6 illustrates an example of an age verification system 1102 interacting with a fuel pump 1103. The fuel pump 1103 may be any of the fuel pump implementations described earlier in this application and may utilize interface elements such a key pad, display, card reader, cameras, microphones, biometric sensors, wireless communication with mobile devices or other interface devices for age verification or individual identification purposes. The fuel pump 1103 may collect information from the user through the interface elements, (for example by reading the driver's license in the card reader) and provide that information to the age verification system to verify the age or identity of the person at the fuel pump 1103. The age verification system 1102 may connect with the fuel pump 1103 through a first communication interface over a network. The age verification system 1102 may, in some implementations, be integrated into the server 120 or server 174. Although, in some implementations, the age verification system 1102 may be located within the fuel pump 1103

The fuel pump 1103 or the age verification system 1102 may then interact with an accessory 1104 through a second communication interface in response to the age or identity verification. The accessory 1104 may be a kiosk 1104*a*, a lock 1104*b* providing access to a restricted area (e.g., an age restricted area of a store) or a charger 1104c. One example of the kiosk 1104a may include an age restricted device, for example aerosol delivery devices, such as electronic nicotine delivery systems and/or devices capable of delivering other active ingredients that may be age restricted, such as various cannabinoids. The accessory 1104 may be immediately activated by the fuel pump 1103 or age verification system 1102 based on the verification, or access may be tied to another identifier such as a code, a biometric identifier, or other access mechanism that can be used to separately activate the accessory 1104 (e.g. charger, kiosk, or lock to provide access to the restricted area). The charger 1104c may be to charge an electronic nicotine delivery systems ("ENDS") device or other electronic delivery device that may provide age restricted substances. The kiosk 1104a or lock 1104c to the restricted area may be to provide access to age restricted products such as tobacco, alcoholic products, *cannabis* related products, or gambling related products (e.g. lottery tickets). The kiosk 1104a may directly distribute products to the user and may be located outside adjacent to or integrated within the fuel pump 1103. In one example, a printer may be integrated into the fuel pump 1103 or a kiosk to print lottery tickets when requested by the user interface after the age and/or identity is verified. In another example, a kiosk may store vaping cartridges or other consumables for use with an aerosol delivery device or other age restricted device that are dispensed upon request after the age and/or identity is verified The kiosk 1104a may also be located in a convenience store located on the premises of the fuel pump 1103. The lock 1104b that provides access to the restricted area may also be located in a convenience store located on the premises of the fuel pump 1103.

As another example, the age verification system 1102 may be interfaced with a security system or component thereof, such as a security camera that may be present in a store proximate the fuel pump 1103 that is age restricted and/or that includes an age restricted area. A user who is verified to be of age by the age verification system 1102 at the fuel pump 1103 may be permitted entry to the store (or age restricted area thereof), but a user who is not verified may be denied access. For example, images of verified users may be conveyed to the security system and facial recognition may be performed by a security camera on individuals attempting to enter the store or age restricted area thereof. If the person entering the store does not match an authorized list of individuals who have been authenticated and age verified at the fuel pump 1103, the individual may be denied entry and/or an attendant may be alerted that an unauthorized individual is attempting to enter the restricted area.

The fuel pump 1103 communicates with the age verification system 1102 in order to verify the user's age, which may also be used to authenticate the accessory 1104 periodically. As described, the age verification system 1102 may not only verify an age (e.g. for an age restricted product), but may also provide authentication or user identification (e.g. for an actual purchase or to prevent theft). The authentication described below may rely on age verification being performed first and then referenced for subsequent authentication. However, there may be other verification mechanisms other than just for age. For example, in some embodiments, user identification may be performed in lieu of age verification. The age verification system 1102 is further described with reference to FIG. 8.

The fuel pump 1104 and/or the accessory 1104 may include a biometric sensor. The biometrics of a user may be detected and used for verification or authentication of the user. Example biometrics include fingerprints, facial recognition, iris/eye recognition, blood, or DNA. In one example, the biometric sensor may be used to periodically re-authenticate a user whose age was already verified. For example, for each new cartridge, a user may be required to apply their fingerprint to the biometric sensor to authenticate and ensure that another user is not using the already age-verified device. The periodicity of re-authentication can be varied and may be based on time and/or other triggers. Example authentication examples, including biometrics.

Figure 7:
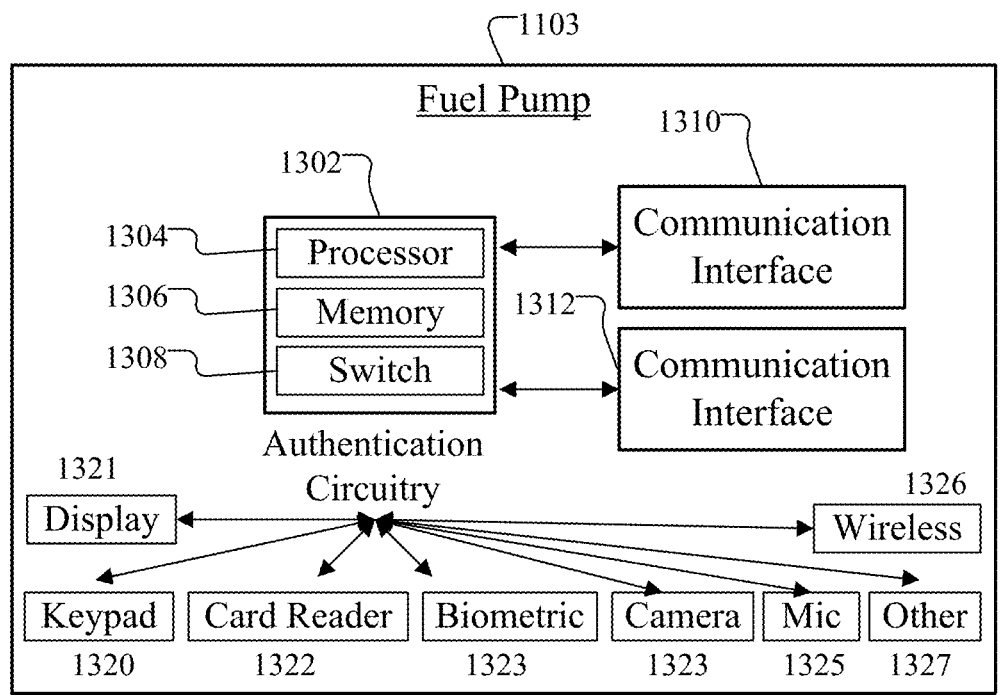
FIG. 7 is a block diagram illustrating the age verification circuitry.

FIG. 7 illustrates an embodiment of a authentication circuitry 1302 in the fuel pump 1103. The authentication circuitry 1302 may operate to perform the authentication or may also be used for the initial age verification. The authentication circuitry 1302 may include a processor 1304, a memory 1306, and a switch 1308. The fuel pump 1103 may utilize interface elements such a key pad 1320, display 1321, card reader 1322, cameras 1323, microphones 1324, biometric sensors 1325, wireless communication 1326 with mobile devices or other interface devices 1327 for age verification or individual identification purposes.

The processor 1304 in the authentication circuitry 1302 may be on one or more chips and may include a central processing unit (CPU), a graphics processing unit (GPU), a digital signal processor (DSP) or other type of processing device. The processor 1304 may be one or more general processors, digital signal processors, application specific integrated circuits, field programmable gate arrays, servers, networks, digital circuits, analog circuits, combinations thereof, or other now known or later developed devices for analyzing and processing data. The processor 1304 may operate in conjunction with a software program, such as code generated manually (i.e., programmed).

The processor 1304 may be coupled with a memory 1306, or the memory 1306 may be a separate component. The memory 1306 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 1306 may include a random access memory for the processor 1304. Alternatively, the memory 1306 may be separate from the processor 1304, such as a cache memory of a processor, the system memory, or other memory. The memory 1306 may be an external storage device or database for storing recorded ad or user data. Examples include a hard drive, compact disc ("CD"), digital video disc ("DVD"), memory card, memory stick, floppy disc, universal serial bus ("USB") memory device, or any other device operative to store ad or user data. The memory 1306 is operable to store instructions executable by the processor 1304.

The functions, acts or tasks illustrated in the figures or described herein may be performed by the programmed processor executing the instructions stored in the memory 1306. Specifically, the operation of the age verification system 1102 may be performed by the processor 1304 based on instructions from the memory 1306. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The processor 1304 may be configured to execute software including instructions for verifying a user's age or for subsequent authentication operations for the age verification system 1102. In some implementations, the age verification can be provided from the age verification system 1102 through the communication interface 1310. Specifically, if the processor 1304 cannot verify a user's age, then the switch 1308 can be activated through the communication interface 1312 to prevent operation of the accessory 1104, for example by denying the user access to the age restricted products.

Figure 8:
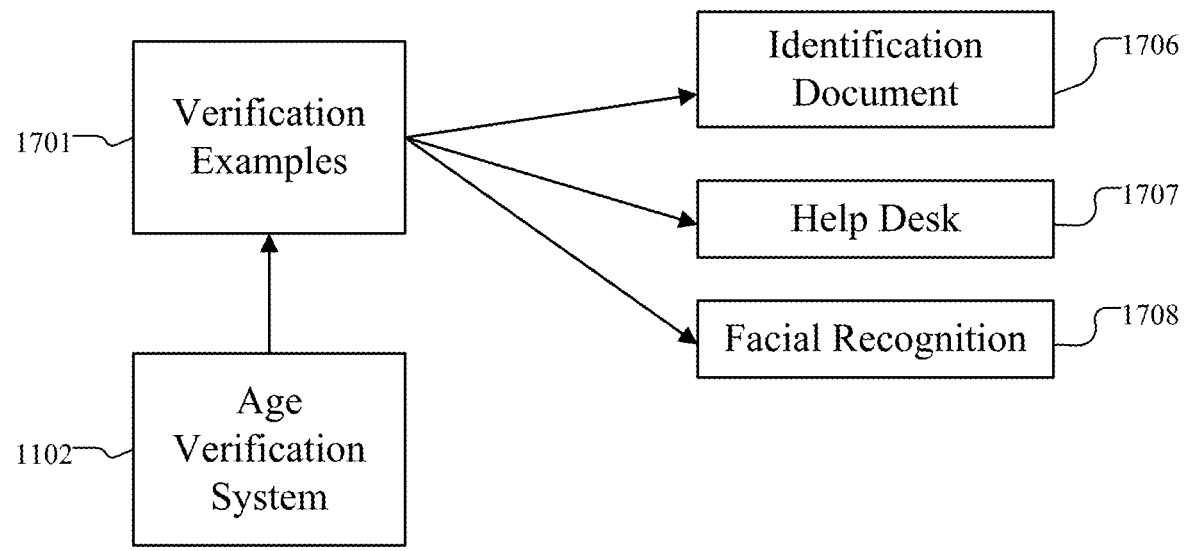
FIG. 8 is a block diagram illustrating verification examples.

FIG. 8 illustrates verification examples 1701 from the age verification system 1102. As described, age verification is a process by which a user's age is verified. The age verification system 1102 provides functionality for verifying the age of a user. The age verification may be for a particular user such that the verification applies for multiple devices used by that user, but may still require authentication for each individual device. In some embodiments, each device may require the age verification process in addition to subsequent authentications. The verification examples 1701 are example mechanisms to verify the user's age. As an initial age verification, the age verification system 1102 may require some identification documentation 1706 to establish the age of a user. For example, a driver's license or passport may be uploaded to establish a user's age. The image from that documentation may be used for future age verification by performing facial recognition 1708 using that image. Facial recognition technology can analyze the two images to either confirm identity match, reject identity verification, or flag the verification to request additional identification information. In alternative embodiments, the verification step may include an audible input from the user, such as recitation of a number, sequence, or code to verify liveliness. Facial recognition may also be used for the authentication process as described below with respect to FIG. 9. Another verification example 1701 includes a help desk 1707 phone call in which a user can confirm identity by providing or confirming user information. In one embodiment, the help desk 1707 can be used to confirm information provided in the identification document 1706.

Figure 9:
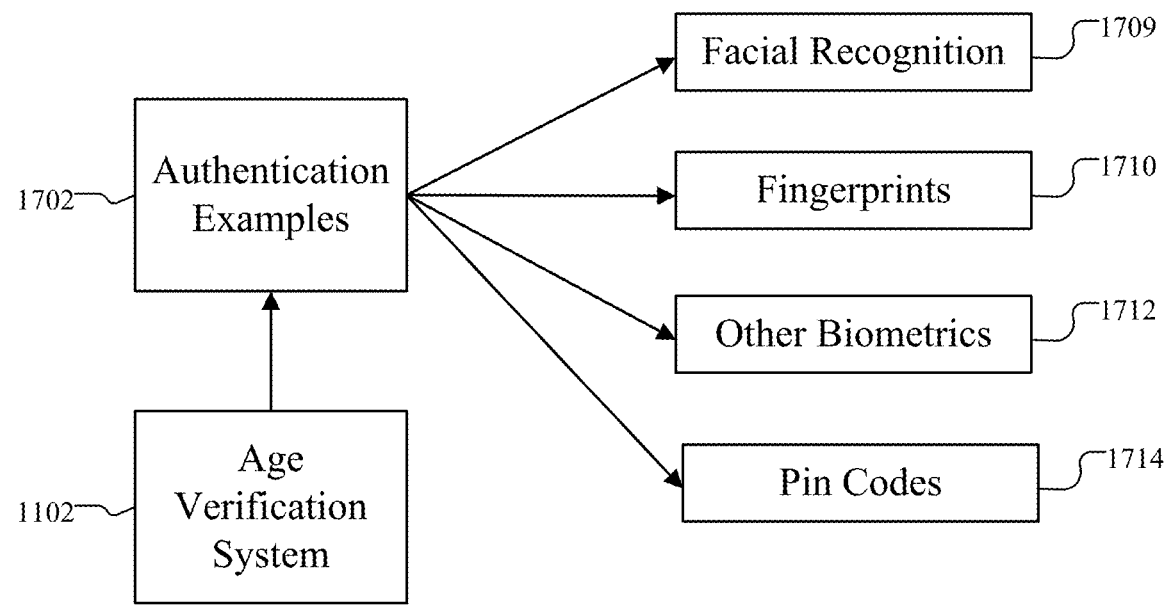
FIG. 9 is a block diagram illustrating authentication examples.

FIG. 9 illustrates authentication examples 1702 from the age verification system 1102. The age verification system 1102 provides an indication as to whether a user/device should be authenticated. As described above, the age verification system 1102 may perform age verification in addition to this authentication. The authentication examples 1702 are example mechanisms to either unlock a device or allow charging of that device when a user is authenticated. The authentication may include merely determining an identity of a user and confirming that the user has previously had their age verified. Facial recognition technology 1709 can analyze the two images to either confirm identity match, reject identity authentication, or flag the authentication to request additional identification information. This authentication may include comparing that image to a live self-image ("selfie") or video that the user takes with their mobile device or webcam. This may prevent fraud of merely showing a picture of someone. Specifically, this reduces the potential for using a hard-copy photo to trick the facial recognition software (i.e. holding up the driver's license close to the webcam). The selfie image that the user uploads can also be checked for liveliness by recording a short video to ensure that the frames change. In alternative embodiments, the authentication step may include an audible input from the user, such as recitation of a number, sequence, or code to verify liveliness.

Other authentication examples 1702 include fingerprints 1710. The charger accessory 1104 may include some form of a fingerprint reader for verifying the user after that user has been age verified. In one embodiment, a host may receive the fingerprint that is used for either unlocking the accessory 1104 as part of the authentication process. Other than facial recognition 1709 and fingerprints 1710, there may be other biometrics 1712 that are used for verifying a user, such as DNA, blood, or other biological indicators. Not only may biometrics 1712 be used as part of the authentication process, they may also be used for the age verification process and may be another verification example 1701. Further, the help desk 1707 verification example may also be used as an authentication example 1702 in which a user can authenticate a device by calling the help desk and providing identity information (e.g. name, birth date, social security number, phone number, email, address, and/or a password, such as mother's maiden name).

As a further example, pin codes 1714 may be used for authenticating a user. A pin code may include a password that is associated with the user and used for unlocking the charger accessory 1104. The pin code may be used to unlock the charging abilities of the product even when the accessory 1104 is not connected to a network. The pin code may include a button in which a certain code must be entered or may include different sensors for detecting a unique interaction.

Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple devices, such as the accessories 1104, the fuel pump 1103 and the age verification system 1102. The network may include a wireless network and may employ stand-alone ad-hoc networks, mesh networks, Wireless LAN (WLAN) networks, wireless wide area network (WWAN), wireless metropolitan area network (WMAN), cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, 4G, 5G, or future iterations) cellular technology, or the like. A network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, Zigbee, Z Wave, IEEE 802.16 (e.g., WMax) and/or other WWAN/WMAN technology, or the like, including future iterations of any of the aforementioned technologies. A wireless network may include virtually any type of wireless communication mechanism by which signals may be communicated between devices, such as the accessory 1104, the fuel pump 1103 and the age verification system 1102, between or within a network, or the like. In some embodiments, the communication protocols listed above may be used for communication between the age verification system 1102 and the fuel pump 1103, and the fuel pump 1103 then communicates with the accessory 1104 through the same or different communication protocols.

Signal packets communicated via a network, such as the network or a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address. This signal packet communication may be applicable to the data communication between the fuel pump 1103 and the accessory 1104, or may be applicable to communications between the fuel pump 1103 and the age verification system 1102.

The age verification system 1102 may include a database that tracks users along with ages. It may be encrypted and/or use anonymous identifiers (e.g. numbers, letters, or any alphanumeric identifiers) for each user. FIG. 17a describes how the initial age verification may occur (e.g. identification documentation 1706) and that may be stored in the database, so all future age verification requests by that user are confirmed. Specifically, once a user is initially age verified as confirmed in the age verification system database, future verifications (i.e. "authentications") may be merely calls to this database for unlocking the accessory 1104. In other words, a user initially performs an age verification and then subsequent usage may require authentication without the complete initial age verification requirements. The frequency with which the accessory 1104 must be unlocked or authenticated can vary. Likewise, the timing for when a user needs to re-verify their age may vary. For example, each time an request for a product is made, the user may need to re-verify or re-authenticate. In some embodiments, the re-authentication may be required after a certain number of orders or may be based on the passage of time. The online database may track the requests for authentication and set limits per user. This can prevent the potential fraud of a single user unlocking access for other under-age users. This also would prevent the re-use of unlocked (e.g. verified and authenticated) accessories. Reasonable limits for the number of devices, chargers, and/or authentications can prevent this potential fraud. For example, the limit may be no more than ten accessories in a six month period.

In some embodiments, the accessory 1104 will not be unlocked unless the accessory 1104 receives the proper data package. The data package can be based on any number of encryption techniques including, for example, a 128-bit encryption, 192-bit encryption, or 256-bit encryption. In some embodiments, Advance Encryption Standard (AES) techniques may be used In addition, this encryption key can be dynamic where the code changes after a predetermined length of time. The random number generators on the fuel pump 1103 and the accessory 1104 may be synced so that they always have matching key codes.

The data communication may include instructions for unlocking the accessory 1104 from the fuel pump 1103 or from the age verification system 1102. This data communication may be wired or wirelessly and utilize communication protocols discussed above, including but not limited to Bluetooth, WiFi, Zigbee, Z wave, or any other wireless communication protocol. The accessory 1104 may includes a receiver chip internal to a housing that can receive and/or send data. The accessory 1104 may communicate with a host (such as a mobile phone) that receives a verification that the user is of proper age from the age verification system online. The host may then transmits data to the accessory 1104 via the wireless connection. When the accessory 1104 receives a correct data or code from the host, it will activate a switch on its internal printed circuit board that allows access to the user (e.g. dispense the product, unlock the restricted area, or charge the END). If the data code is not correct, or no code is received, then the switch remains inactive preventing the accessory 1104 from providing access.

The communication may also be through electric pulses, or may include some combination of electric pulses and data/code. Specifically, the electric pulses may utilize the electronics inherent in the device and the accessory 1104. Specifically, the sequence may be unique, such as a square wave, sine wave, triangle wave, or other profile of on/off pulses. The accessory 1104 may be looking for a specific sequence before it allows access to the user.

As described above, the age verification through the age verification system 1102 may be through an online connection from a computing device (e.g. smartphone, laptop, tablet, etc.) through which the user verifies their identity and age. In one embodiment, there may be an application (or "app") on a smartphone that provides the connection with the age verification system 1102. The app may include the ability to provide documentation (e.g. driver's license, passport, social security number, etc.) by either photograph, copying, or uploading. In other embodiments, the app may include the age verification system 1102 functionality locally such that the app can verify an age without requiring another network system. In other embodiments, the accessory 1104 may have the functionality to verify the user age from the online age verification system 1102. In an alternative embodiment, there may be help desk phone service through which the user calls to verify their age.

The initial age verification may be saved at the age verification system 1102, either at an online resource or locally with an app. As discussed above, each user may be stored in a database that tracks ages that can be referenced for future authentications. Authentication may be referred to as re-verifying the age verification and may not include the same process as the initial age verification. The initial age verification may require certain evidence of the age, whereas subsequent authentication may only require verifying identity and then confirming that identity is of the correct age with the age verification system 1102. As described each future authentication may be required periodically, may be based on usage, or may be required each time a request is made.

The methods, devices, processors, modules, engines, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

As a person skilled in the art will readily appreciate, the above description is meant as an illustration of implementation of the principles this disclosure. This description is not intended to limit the scope or application of this system in that the system is susceptible to modification, variation and change, without departing from the spirit of this disclosure, as defined in the following claims.

We claim:

1. A fuel pump monitoring module for monitoring attributes related to a fuel pump including a location of a bioremediation dispensing unit, the fuel pump monitoring module comprising:
a body configured to attach to the fuel pump;
a transmitter or receiver connected to the body and configured to communicate with a bioremediation dispensing unit using a transmission signal;
a processor connected to the body and configured to determine the location of the bioremediation dispensing unit relative to the fuel pump monitoring module based on the transmission signal.

2. The fuel pump monitoring module of claim 1, wherein a fill level of the bioremediation dispensing unit is received over the transmission signal.

3. The fuel pump monitoring module of claim 1, wherein a dispensing action of the bioremediation dispensing unit is received over the transmission signal.

4. The fuel pump monitoring module of claim 1, wherein a battery level of the bioremediation dispensing unit is received over the transmission signal.

5. The fuel pump monitoring module of claim 1, wherein the location of the bioremediation dispensing unit is determined based on a signal strength of the transmission signal.

6. The fuel pump monitoring module of claim 1, further comprising a plurality of transmitters or receivers, each transmitter or receiver communicating using a different transmission signal.

7. The fuel pump monitoring module of claim 6, wherein each of the plurality of transmitters or receivers are separated and the location of the bioremediation dispensing unit is determined based on triangulation.

8. The fuel pump monitoring module of claim 1, further comprising a communication interface configured to communicate the location the bioremediation dispensing unit to a task server.

9. The fuel pump monitoring module of claim 8, wherein the task server generates a task for an employee to inspect a pump area based on the location of the bioremediation dispensing unit.

10. The fuel pump monitoring module of claim 8, wherein the task server generates a task for an employee to inspect a pump area based on an amount of time since a last inspection.

11. The fuel pump monitoring module of claim 8, wherein the task server generates a graphic with a marker identifying an area to be inspected.

12. The fuel pump monitoring module of claim 1, further comprising a door sensor to identify if pump door has been opened.

13. The fuel pump monitoring module of claim 1, further comprising an acceleration sensor attached to a pump door to identify movement of the pump door.

14. The fuel pump monitoring module of claim 13, further comprising a communication interface in communication with a task server, wherein the task server generates a task for an employee to inspect the fuel pump based on the acceleration sensor.

15. A fuel pump monitoring module for monitoring attributes related to a fuel pump including a location of a bioremediation dispensing unit, the fuel pump monitoring module comprising:
a body configured to attach to the fuel pump;
a transmitter or receiver connected to the body and configured to communicate with a consumer mobile device using a transmission signal;
a processor connected to the body and configured to determine a user identification based on the transmission signal.

16. The fuel pump monitoring module of claim 15, wherein the processor is configured to access a user profile based on the transmission signal.

17. The fuel pump monitoring module of claim 15, wherein the processor is configured to transmit a coupon to the consumer mobile device based on preferences in the user profile.

18. The fuel pump monitoring module of claim 15, wherein the processor is configured transmit customized programing to display based on preferences in the user profile.

19. A bioremediation dispensing unit for treating deposits around a fuel pump, the bioremediation dispensing unit comprising:
- a tank configured to store bioremediation;
- a handle attached to the tank;
- a trigger configured to dispense the bioremediation;
- a transmitter or receiver connected to the body and configured to communicate with a fuel pump monitoring module using a transmission signal to determine a location of the transmitter or receiver relative to the fuel pump monitoring module.

20. The bioremediation dispensing unit of claim 19, further comprising a fill level sensor, the transmitter being configured to transmit a fill level to the fuel pump monitoring module from the fill level sensor.

21. The bioremediation dispensing unit of claim 19, further comprising a trigger sensor, the transmitter being configured to transmit an actuation signal to the fuel pump monitoring module from the trigger sensor.

22. A fuel pump system for refueling a vehicle in communication with an age verification system and an accessory comprising:
- at least one interface element configured to receive information indicative of an age or identity of a user;
- a first communication interface configured to connect with the age verification system;
- a second communication interface configured to connect with the accessory; and
- circuitry configured to activate the accessory through the second communication interface to provide access to an age restricted product in response to receiving an age verification from the age verification system through the first communication interface.

* * * * *